US011579453B2

(12) United States Patent
Amitai et al.

(10) Patent No.: US 11,579,453 B2
(45) Date of Patent: Feb. 14, 2023

(54) COMPACT BEAM EXPANDING SYSTEM

(71) Applicant: OORYM OPTICS LTD., Rehovot (IL)

(72) Inventors: Yaakov Amitai, Rehovot (IL); Nadav Amitai, Rehovot (IL)

(73) Assignee: OORYM OPTICS LTD., Rehovot (IL)

( * ) Notice: Subject to any disclaimer, the term of this patent is extended or adjusted under 35 U.S.C. 154(b) by 86 days.

(21) Appl. No.: 17/308,980

(22) Filed: May 5, 2021

(65) Prior Publication Data

US 2021/0294108 A1 Sep. 23, 2021

Related U.S. Application Data

(62) Division of application No. 15/999,303, filed as application No. PCT/IL2017/050192 on Feb. 15, 2017, now Pat. No. 11,042,030.

(30) Foreign Application Priority Data

Feb. 18, 2016 (IL) .......................................... 244179

(51) Int. Cl.
*G02B 27/01* (2006.01)
*G02B 27/10* (2006.01)
(Continued)

(52) U.S. Cl.
CPC ........... *G02B 27/0172* (2013.01); *G02B 6/00* (2013.01); *G02B 27/0081* (2013.01); *G02B 27/1066* (2013.01); *G02B 27/126* (2013.01); *G02B 27/144* (2013.01); *G02B 2027/0123* (2013.01); *G02B 2027/0178* (2013.01)

(58) Field of Classification Search
CPC .. G02B 6/00; G02B 27/0081; G02B 27/0172; G02B 27/1066; G02B 27/126; G02B 27/144; G02B 2027/0123; G02B 2027/0178
See application file for complete search history.

(56) References Cited

U.S. PATENT DOCUMENTS

2012/0062998 A1 3/2012 Schultz et al.
2013/0322810 A1 12/2013 Robbins
(Continued)

FOREIGN PATENT DOCUMENTS

WO    WO 2008/023367    2/2008

OTHER PUBLICATIONS

European Patent Office, European International Search Report and Written Opinion of the International Searching Authority, PCT/IL2017/050192, dated Jun. 1, 2017, 18 pages.

*Primary Examiner* — Jack Dinh

(57) ABSTRACT

There is provided an optical device, including an input aperture, an output aperture, at least first and second light-transmitting substrates each having two major surfaces and edges, an input surface for coupling light waves into the substrate for effecting total internal reflection inside the substrate, and an output surface for coupling light waves out of the substrate, a major surface of the first substrate is attached to a major surface of the second substrate and the input surface of the first substrate is a partially reflecting surface, such that part of the light waves passing through the input aperture is partially reflected by the partially reflecting input surface and coupled into the first substrate and another part passes through the partially reflecting input surface and is coupled by the input surface of the second substrate into the second substrate.

13 Claims, 10 Drawing Sheets

(51) Int. Cl.
*G02B 27/00* (2006.01)
*G02B 6/00* (2006.01)
*G02B 27/12* (2006.01)
*G02B 27/14* (2006.01)

(56) References Cited

U.S. PATENT DOCUMENTS

2015/0277124 A1  10/2015  Ide et al.
2015/0279117 A1  10/2015  Yonekubo

COMPACT BEAM EXPANDING SYSTEM

CROSS-REFERENCE TO RELATED APPLICATION

This application is a divisional of U.S. application Ser. No. 15/999,303, filed Aug. 17, 2018 for "COMPACT BEAM EXPANDING SYSTEM".

FIELD OF THE INVENTION

The present invention relates to substrate-guided optical devices, and particularly to devices which include a multiple of light-transmissive substrates.

The invention can be implemented to advantage in a large number of imaging applications, such as, head-mounted and head-up displays, cellular phones, compact displays, 3-D displays, compact beam expanders as well as non-imaging applications such as flat-panel indicators, compact illuminators and scanners.

BACKGROUND OF THE INVENTION

One of the applications for compact optical elements is in head-mounted displays, wherein an optical module serves both as an imaging lens and a combiner, in which a two-dimensional display is imaged to infinity and reflected into the eye of an observer. The display can be obtained directly from either a spatial light modulator (SLM), such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier and bulkier, and therefore, even for a moderate performance device, is impractical. This is a major drawback for all kinds of displays, but especially in head-mounted applications, wherein the system must necessarily be as light and as compact as possible.

The strive for compactness has led to several different complex optical solutions, all of which, on one hand, are still not sufficiently compact for most practical applications, and, on the other hand, suffer major drawbacks in terms of manufacturability. Furthermore, the eye-motion-box (EMS) of the optical viewing angles resulting from these designs is usually very small—typically less than 8 mm. Hence, the performance of the optical system is very sensitive, even to small movements of the optical system relative to the eye of the viewer, and do not allow sufficient pupil motion for conveniently reading text from such displays.

DISCLOSURE OF THE INVENTION

The present invention facilitates the design and fabrication of very compact substrate for, amongst other applications, head-mounted displays. The invention allows relatively wide FOVs together with relatively large eye-motion-box values. The resulting optical system offers a large, high-quality image, which also accommodates large movements of the eye. The optical system offered by the present invention is particularly advantageous, because it is substantially more compact than state-of-the-art implementations and yet it can be readily incorporated, even into optical systems having specialized configurations.

A further application of the present invention is to provide a compact display with a wide FOV for mobile, hand-held applications, such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically very compact display with a very large virtual image. This is a key feature in mobile communications, and especially for mobile internet access, solving one of the main limitations for its practical implementation. Thereby the present invention enables the viewing of the digital content of a full format internet page within a small, hand-held device, such as a cellular phone.

A broad object of the present invention is therefore to alleviate the drawbacks of state-of-the-art compact optical display devices and to provide other optical components and systems having improved performance, according to specific requirements.

In accordance with the present invention there is therefore provided an optical device, comprising an input aperture, an output aperture, at least first and second light-transmitting substrates each having two major surfaces and edges, an input surface for coupling light waves into the substrate for effecting total internal reflection inside the substrate, and an output surface for coupling light waves out of the substrate, a major surface of the first substrate is attached to a major surface of the second substrate and the input surface of the first substrate is a partially reflecting surface, such that part of the light waves passing through the input aperture is partially reflected by the partially reflecting input surface and coupled into the first substrate and another part passes through the partially reflecting input surface and is coupled by the input surface of the second substrate into the second substrate.

In accordance with the present invention there is also provided an optical device comprising an input aperture, an output aperture, an array of at least a first and a second pair of light transmitting substrates, each of the pairs comprising a first and a second light-transmitting substrate each having two major surfaces parallel to each other and edges, an input surface for coupling light waves into the substrate to effect total internal reflection, and an output surface for coupling light waves out of the substrate; for each pair, a major surface of the first substrate is attached to a major surface of the second substrate, and for at least the first pair of light-transmitting substrates, the input surfaces of the first and the second substrates are partially reflecting surfaces causing part of the incoming light waves passing through the input aperture to be partially reflected by the first and second partially reflecting input surfaces and to be coupled into the first and second substrates, respectively, and another part of the light waves to pass through the first and second partially reflecting input surfaces and to be coupled at least partially by the input surfaces of the first and the second substrates into the first and second substrates into the first and second substrates of the second pair, respectively.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of an exemplary prior art light-guide optical element;

FIG. 2 is a diagram illustrating a prior art method to expand a beam along two axes utilizing a double light-guide optical element configuration;

FIGS. 3A and 3B are diagrams illustrating detailed sectional views of an exemplary prior art array of partially reflective surfaces;

FIG. 4 is a schematic sectional view of a prior art reflective surface with two different impinging rays;

FIG. 5 illustrates a sectional view of an embodiment expanding a beam along the lateral axis utilizing a double substrate configuration, according to the present invention;

FIG. 6 illustrates a sectional view of an embodiment expanding a beam along the lateral axis utilizing a triple substrate configuration, according to the present invention;

Figure 7:
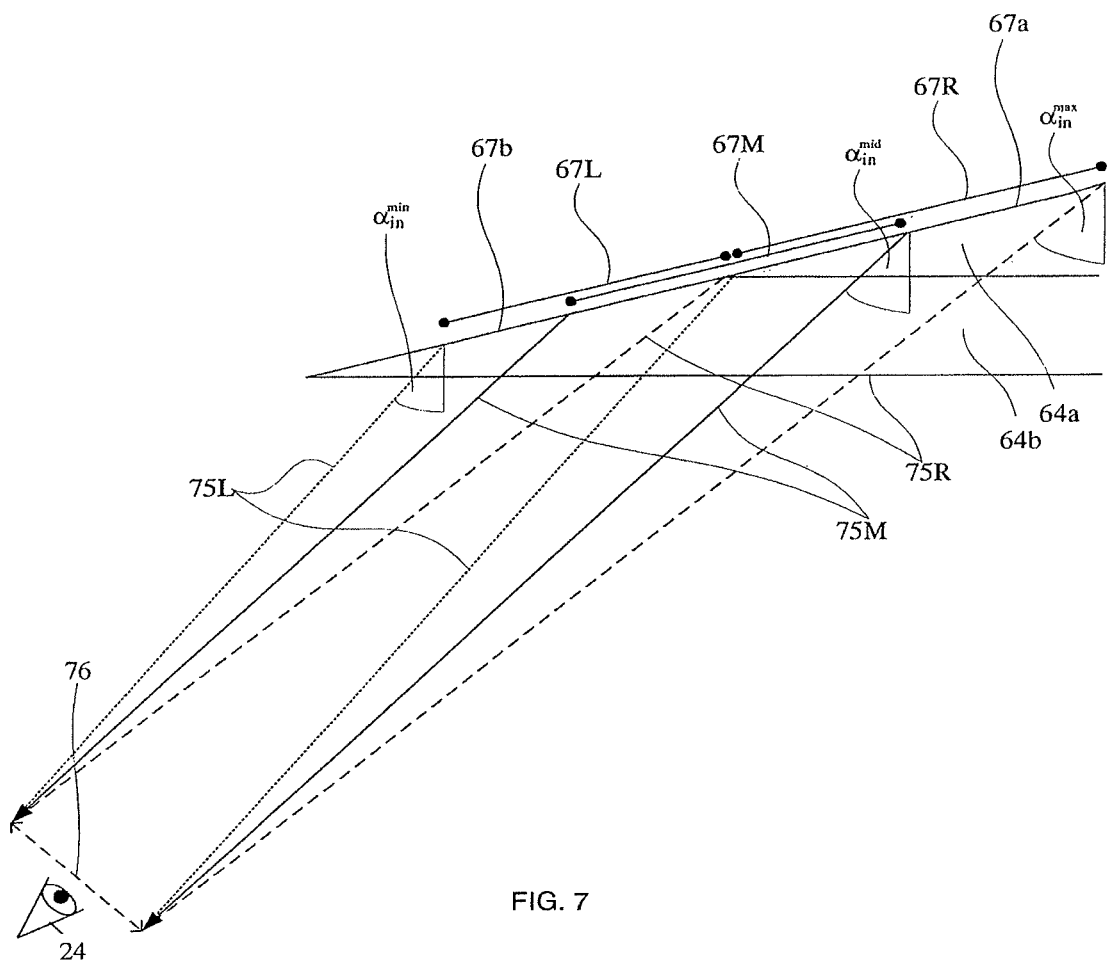
Figure 8A:
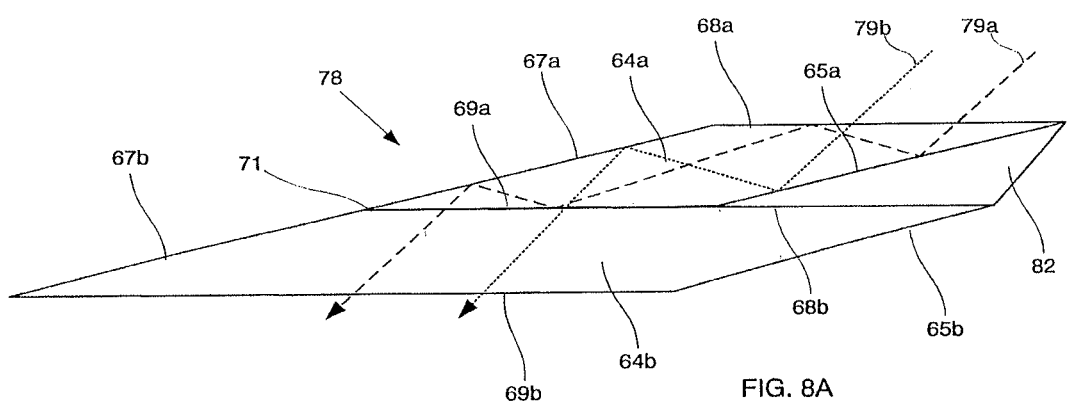
Figure 8B:
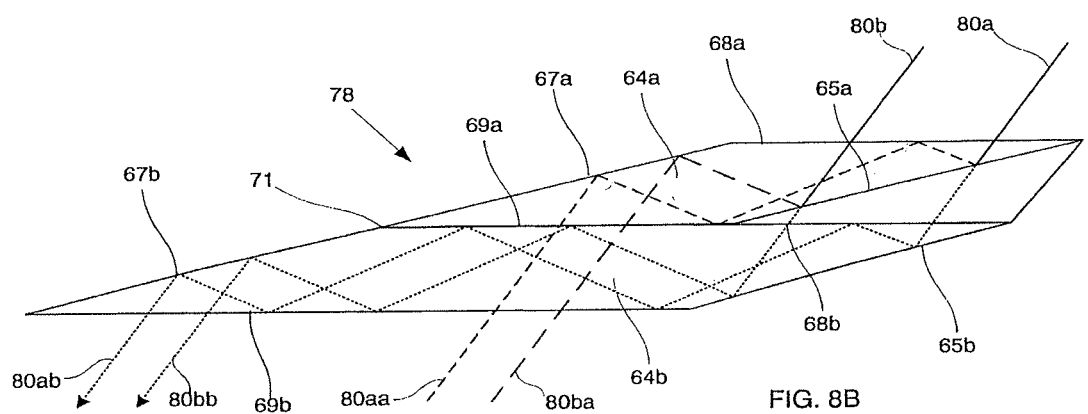
Figure 8C:
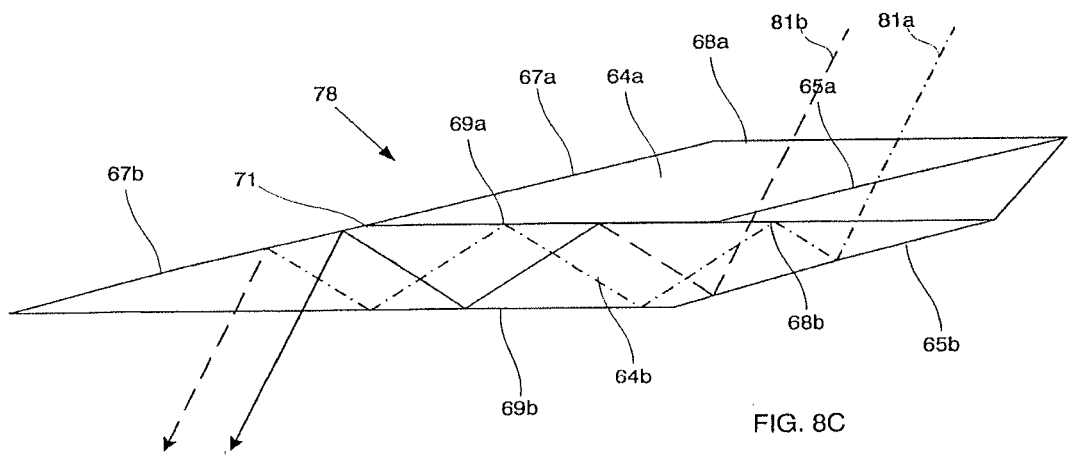
Figure 9:
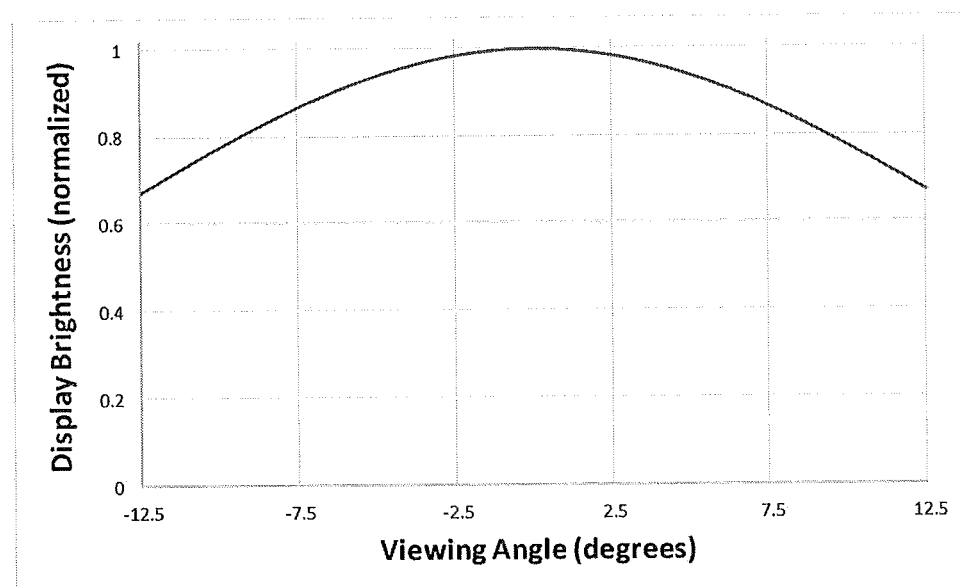
Figure 10:
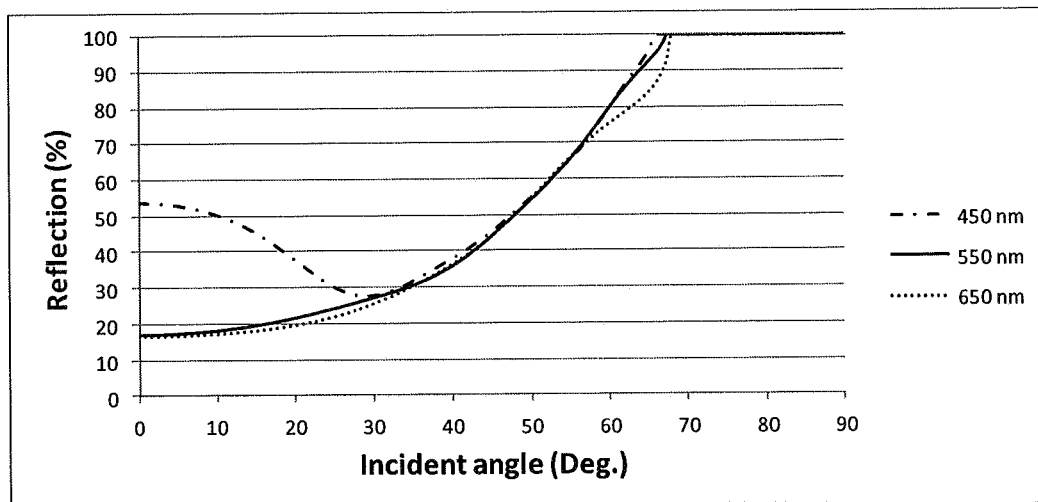
Figure 11:
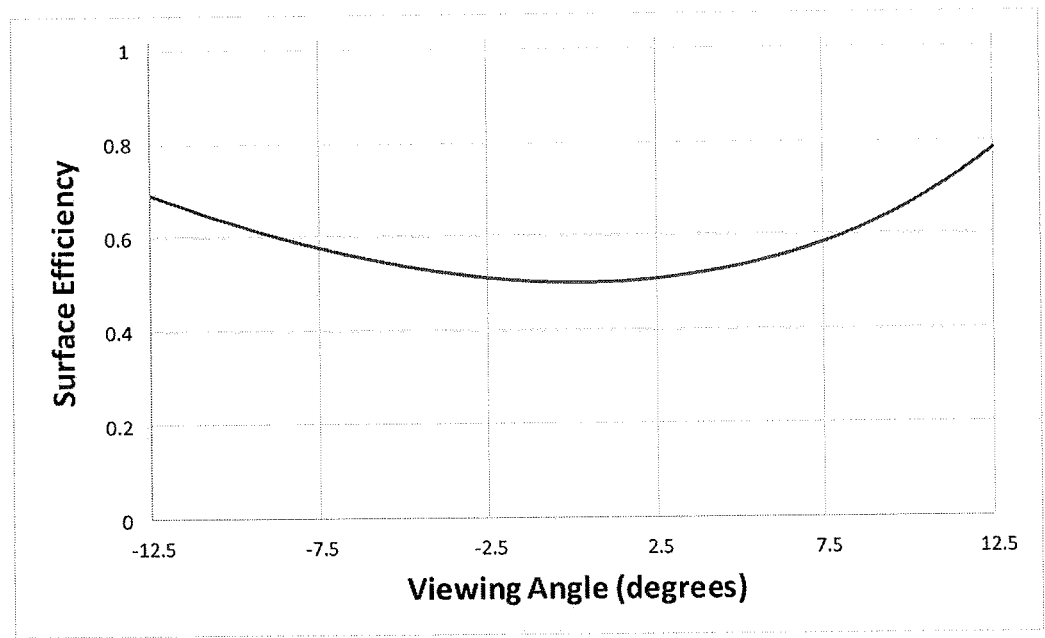
Figure 12:
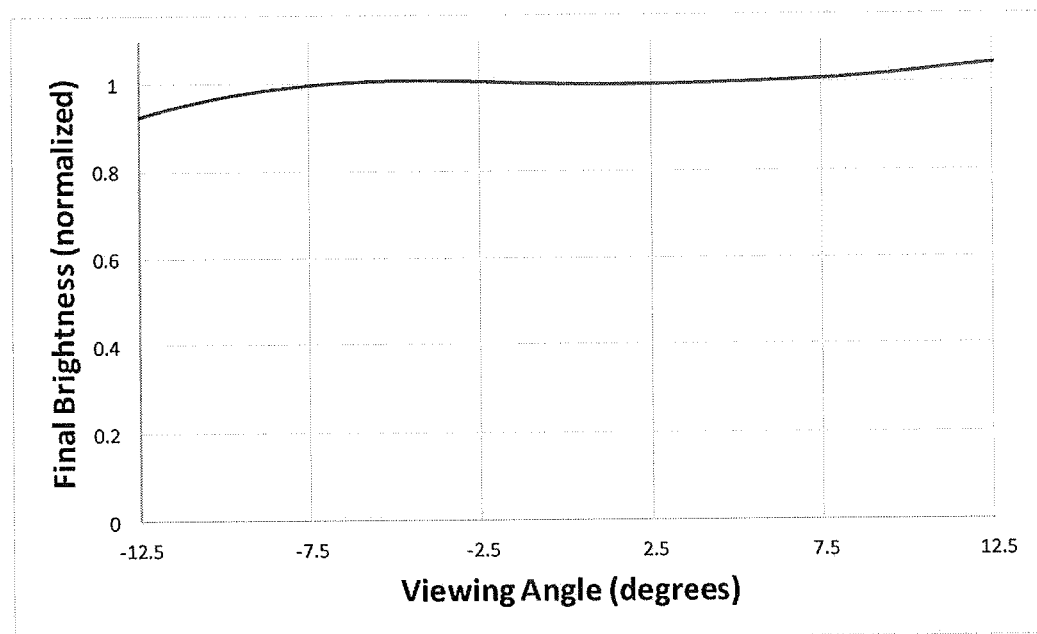
Figure 13A:
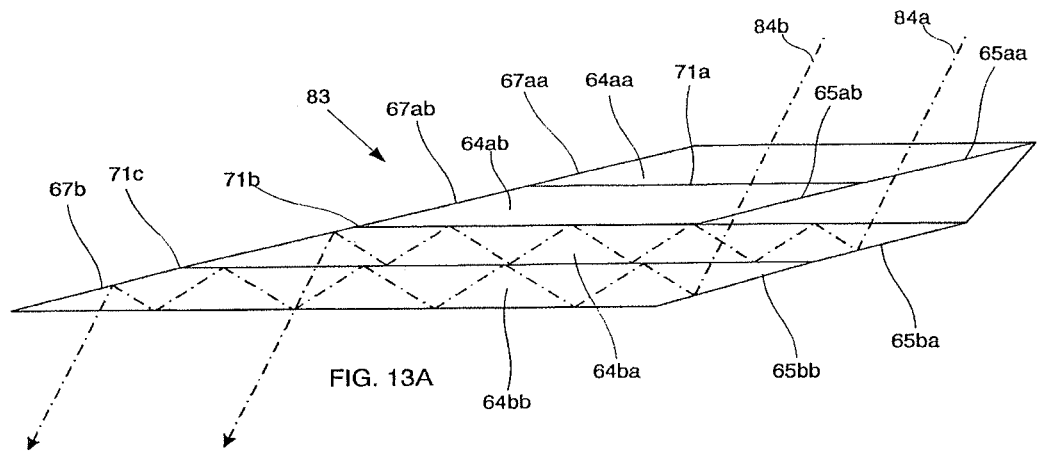
Figure 13B:
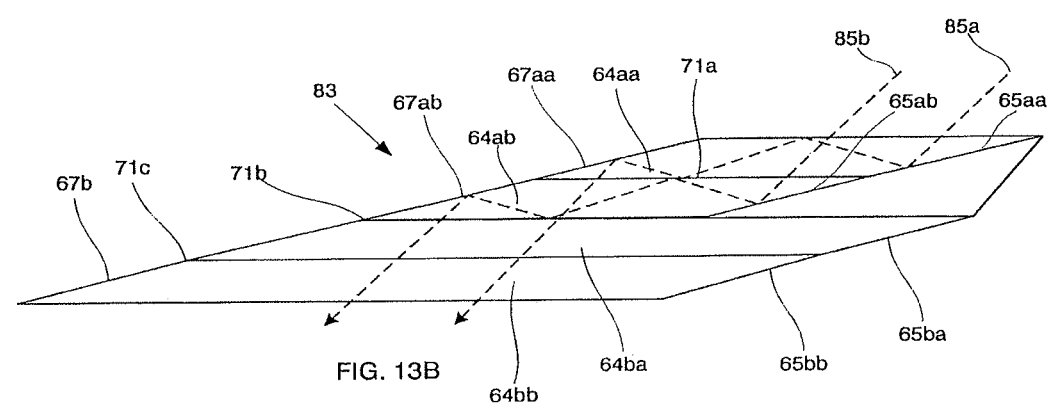
Figure 13C:
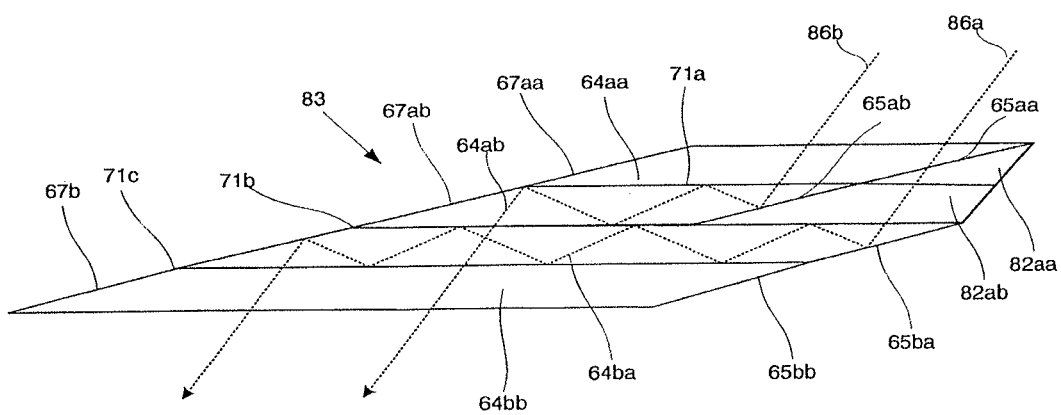
Figure 14A:
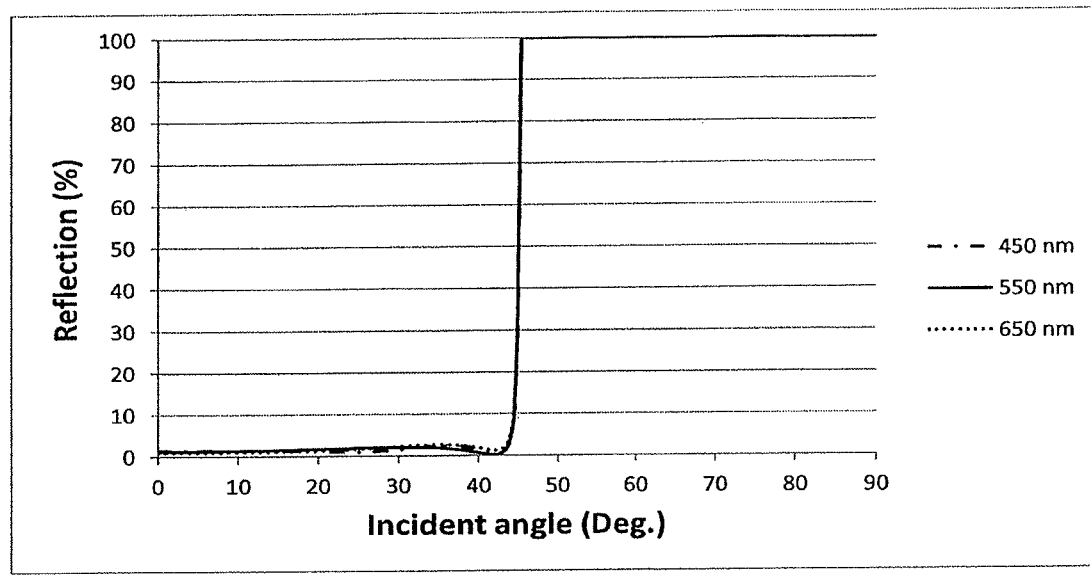
Figure 14B:
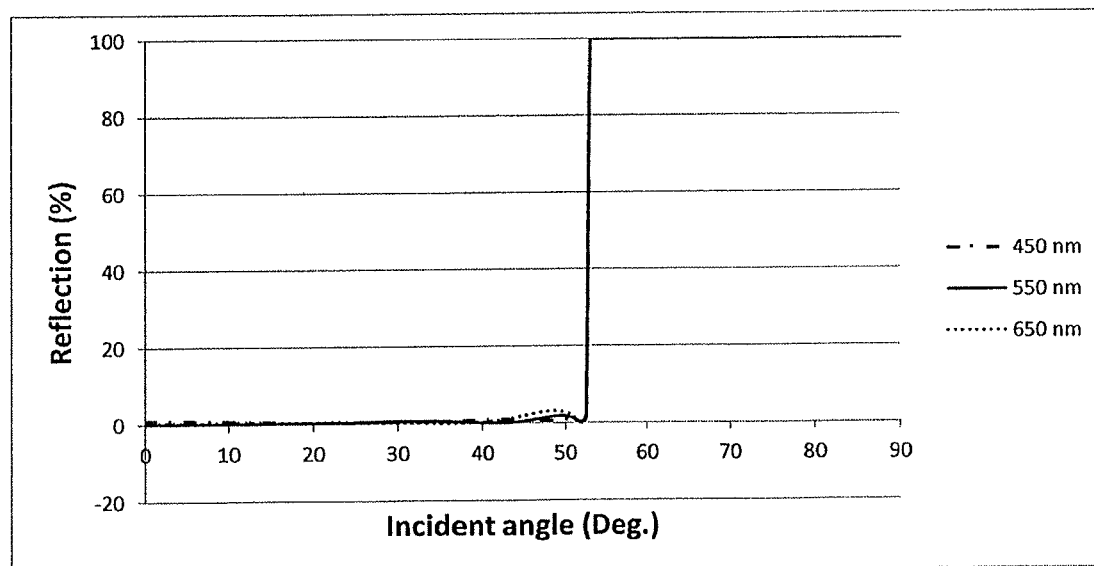
Figure 15A:
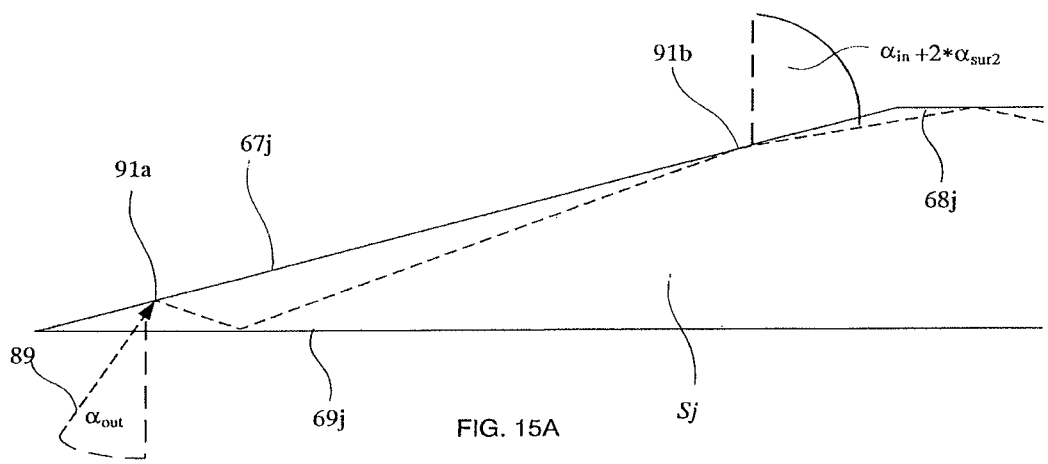
Figure 15B:
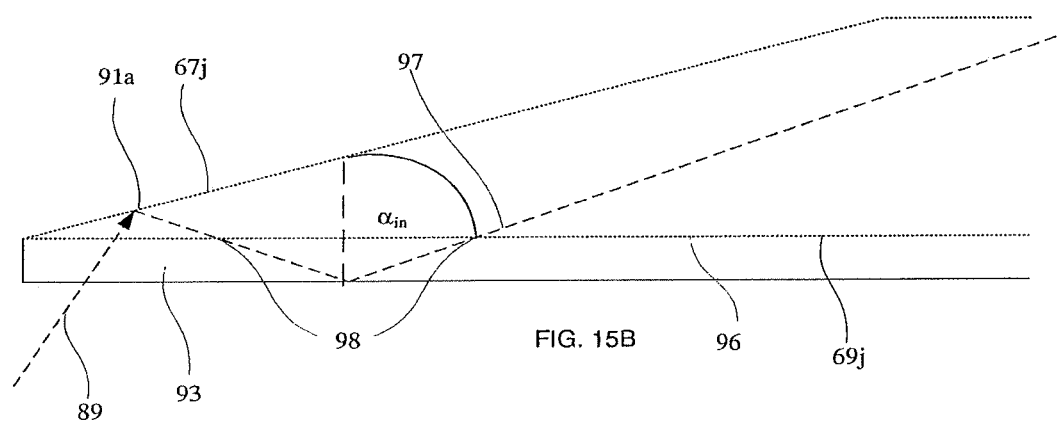
Figure 15C:
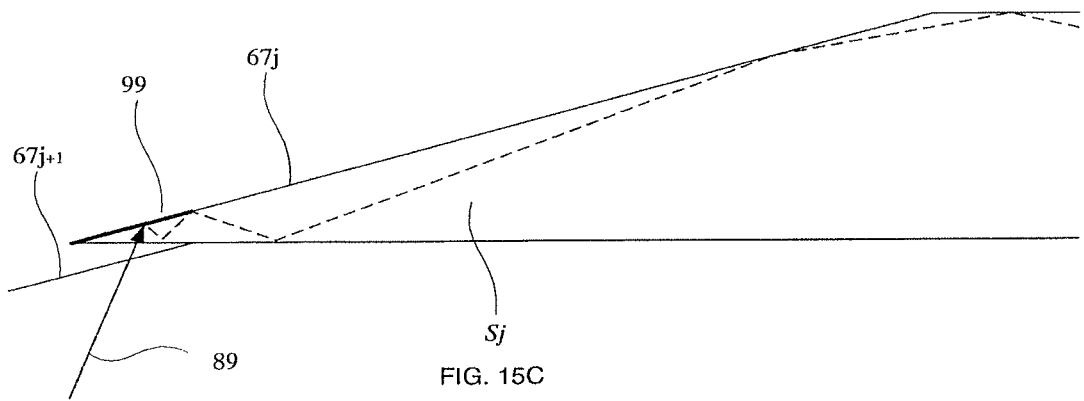

FIG. 7 schematically illustrates the active parts of the coupling-out surfaces according to the viewing angle and the eye-motion-box of the system;

FIGS. 8A, 8B and 8C are schematic sectional-views of optical modules, where two different transparent substrates are optically attached together and one of the coupling-in elements is an angular sensitive reflecting surface, according to the present invention;

FIG. 9 is a graph illustrating the brightness of emerging optical waves from a surface of a typical front-illuminated display as a function of the viewing angle;

FIG. 10 is a graph illustrating the reflection curve of the incident light waves from an angular selective coupling-in surface as a function of the incident angle, according to the present invention;

FIG. 11 is a graph illustrating the practical efficiency of an angular selective coupling-in surface as a function of the incident angle, according to the present invention;

FIG. 12 is a graph illustrating the normalized brightness of light waves emerging from a front-illuminated display and reflected from an angular selective coupling-in surface as a function of the incident angle, according to the present invention;

FIGS. 13A, 13B, and 13C are schematic sectional-views of lateral beam expander where four different transparent substrates are optically attached together and two of the coupling-in elements are angular selective reflecting surfaces, according to the present invention;

FIGS. 14A and 14B are graphs illustrating the reflection of the incident light waves on two different angular selective coupling-in surfaces as a function of the incident angle, according to the present invention, and FIGS. 15A, 15B and 15C illustrate sectional views of the non-active part of the coupling-out surfaces and methods to block it, according to the present invention.

DETAILED DESCRIPTION

Figure 1:
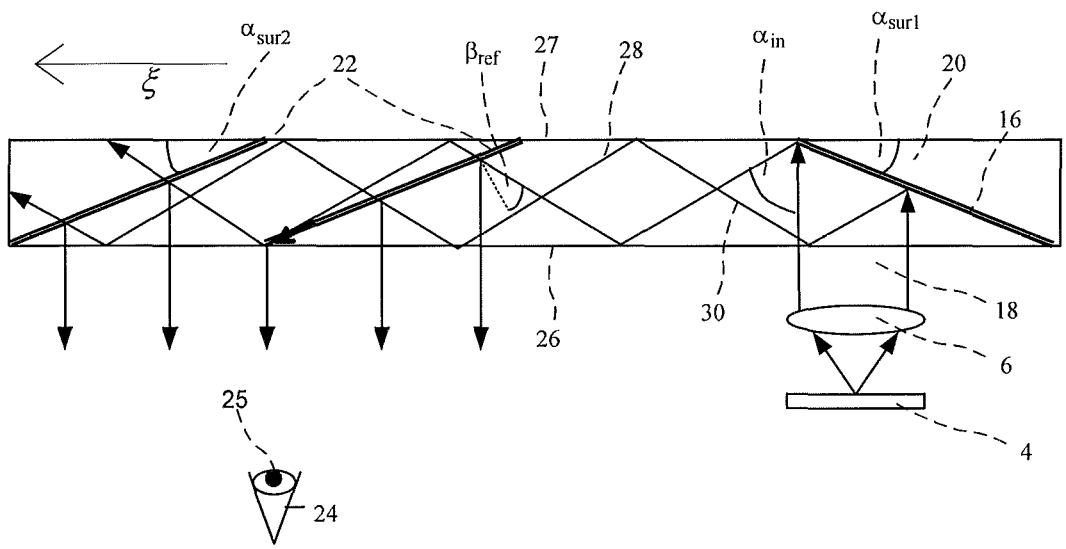

FIG. 1 illustrates a sectional view of a prior art light-guide optical element. The first reflecting surface 16 is illuminated by a plane light wave 18 emanating from a display source 4 and collimating by a lens 6 located behind the device. The reflecting surface 16 reflects the incident light from the source such that the light is trapped inside a planar substrate 20 by total internal reflection. After several reflections off the major surfaces 26, 27 of the substrate, the trapped light waves reach an array of partially reflecting surfaces 22, which couple the light out of the substrate into the eye 24, having a pupil 25 of a viewer. Assuming that the central light wave of the source is coupled out of the substrate 20 in a direction normal to the substrate surface 26, the partially reflecting surfaces 22 are flat, and the off-axis angle of the coupled light wave inside the substrate 20 is $\alpha_{in}$, then the angle $\alpha_{sur2}$ between the reflecting surfaces and the substrate plane is:

$$\alpha_{sur2} = \frac{\alpha_{in}}{2}. \quad (1)$$

As can be seen in FIG. 1, the trapped rays arrive at the reflecting surfaces from two distinct directions 28, 30. In this particular embodiment, the trapped rays arrive at the partially reflecting surface 22 from one of these directions 28 after an odd number of reflections from the substrate surfaces 26 and 27, wherein the incident angle $\beta_{ref}$ between the trapped ray and the normal to the reflecting surface is:

$$\beta_{ref} = \alpha_{in} - \alpha_{sur2} = \frac{\alpha_{in}}{2}. \quad (2)$$

The trapped rays arrive at the partially reflecting surface 22 from the second direction 30 after an even number of reflections from the substrate surfaces 26 and 27, where the off-axis angle is $\alpha'_{in} = -\alpha_{in}$, and the incident angle between the trapped ray and the normal to the reflecting surface is:

$$\beta'_{ref} = \alpha'_{in} - \alpha_{sur2} = \alpha_{in} - \alpha_{sur2} = \frac{3\alpha_{in}}{2}, \quad (3)$$

where the minus sign denotes that the trapped ray impinges on the other side of the partially reflecting surface 22. As illustrated in FIG. 1, for each reflecting surface, each ray first arrives at the surface from the direction 30, wherein some of the rays again impinge on the surface from direction 28. In order to prevent undesired reflections and ghost images, it is desired that the reflectance be negligible for the rays that impinge on the surface having the second direction 28.

One of the parameters of an optical imaging system is the output aperture of the system. Usually, for systems which are designated for projecting images into a viewer's eye, the output aperture is determined by the EMB, the FOV and the eye-relief (namely, the distance between the viewer's eye and the output aperture) of the system. For an optical system such as the one illustrated in FIG. 1, a straightforward way to increase the output aperture along the 4 axis (i.e., the main propagation direction of the light waves along the substrate) is simply to increase the number of the partial reflecting surfaces which are embedded inside the substrate. The output aperture along the orthogonal η axis, however, should also be considered. For a single substrate structure the achievable FOV and EMB along the axis is not dependent upon the size or the number of the partially reflecting surfaces, but rather on the lateral dimension along the axis of the input light waves coupled into the substrate. The maximum achievable FOV along the η axis is:

$$FOV_{max} \approx \frac{3_\eta - d_{eye}}{R_{eye} + l/(\nu \sin\alpha_{in}^{min})}, \quad (4)$$

wherein $D_\eta$ is the lateral dimension along η axis of the input waves coupled into the substrate, $D_{eye}$ is the EMB along η axis, $R_{eye}$ is the eye relief, l is the distance between the input aperture and the far edge of the output aperture of the substrate, ν is the refractive index of the substrate and $\alpha_{in}^{min}$ is the minimal off-axis angle of the coupled light wave inside the substrate. For a substrate having the following parameters:

$$FOV=30°; \ d_{eye}=20 \text{ mm}; \ R_{eye}=20 \text{ mm} \ l=40 \text{ mm}; \\ \nu=1.6; \ \alpha_{in}^{min}=40° \quad (5)$$

the limiting lateral dimension is 54 mm The longitudinal dimension along the ξ axis of the input waves coupled into the substrate is given by $S_1=T*\cot(\alpha_{sur1})$. For a substrate thickness of T=2 mm and an angle between the coupling-in surface 16 and the substrate plane of $\alpha_{sur1}=25°$ the longitudinal dimension along the ξ axis is $S_l$=mm. As a result, the lateral extent of the substrate is more than ten-fold larger than the longitudinal dimension. Even for an image aspect ratio of 16:9 (as with an HD display) and a FOV in the η axis of 16.9°, the required lateral dimension is approximately 28.5 mm, still more than six-fold larger than the longitudinal dimension. This asymmetry is problematic since a collimating lens with a high numerical aperture, or a very large display source is required. With such values, it is impossible to achieve the desired compact system.

Figure 2:
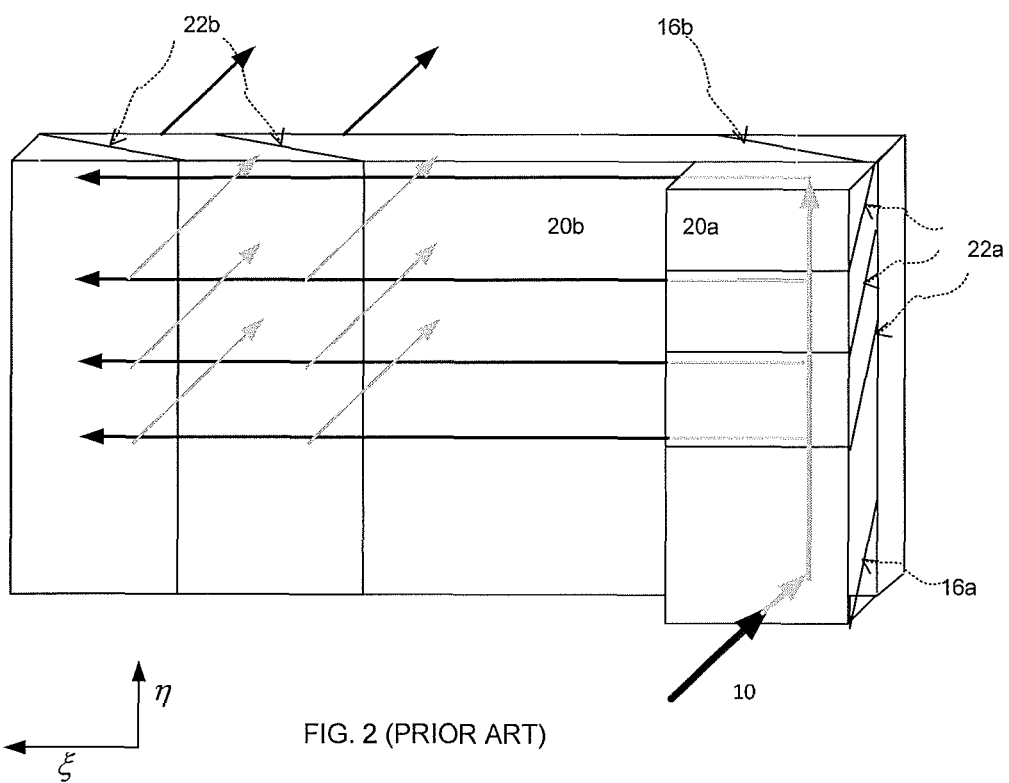

FIG. 2 illustrates how to expand the beam along two axes utilizing a double substrate configuration. The input wave 10 is coupled into the first substrate 20a, which has a structure similar to that illustrated in FIG. 1, by the first reflecting surface 16a and then propagates along the η axis. The partially reflecting surfaces 22a couple the light out of substrate 20a and then the light is coupled into the second substrate 20b by the reflecting surface 16b. The light then propagates along the ξ axis and is coupled out by the partially reflecting surfaces 22b. As shown, the original beam 10 is expanded along both axes, η and ξ, where the overall expansion is determined by the ratio between the lateral dimensions of the elements 16a and 22b.

Figure 3A:
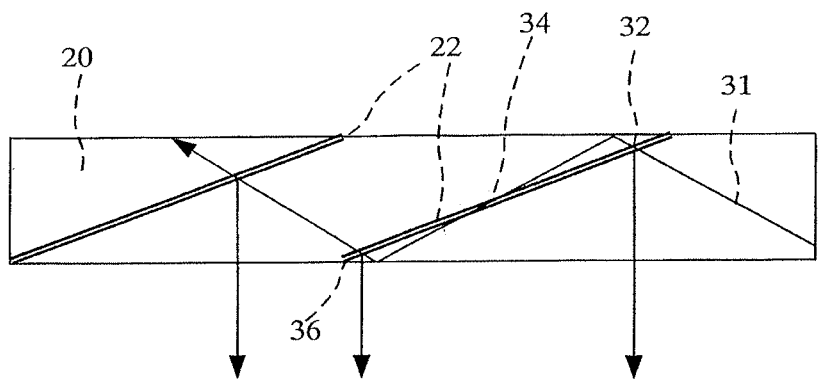
Figure 3B:
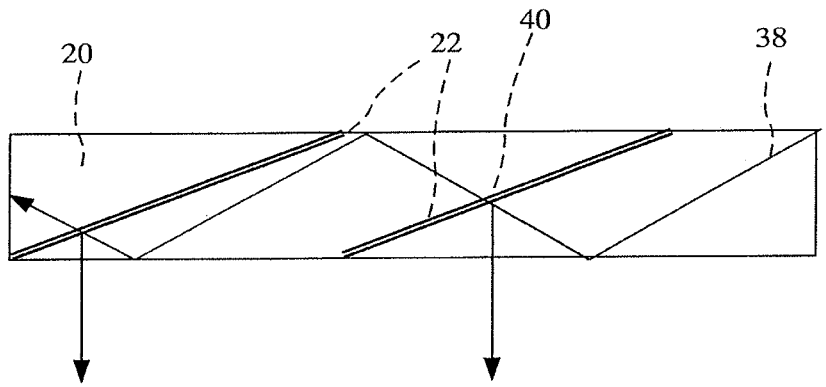

In order to verify whether the embodiment illustrated in FIG. 2 is indeed feasible, it is important to consider the uniformity of the coupled-out image. A potential non-uniformity in the resulting image might occur due to the different reflection sequences of different rays that reach each partial reflecting surface in each one of the two substrates: some rays arrive without previous interaction with a selectively reflecting surface; other rays arrive after one or more partial reflections. This effect is illustrated in FIG. 3A (for simplification, the non-uniformity issue for only a single substrate is considered). Assuming that for example $\alpha_{in}=50°$, the ray 31 intersects the first partially reflecting surface 22 at the point 32. The incident angle of the ray is 25° and a portion of the ray's energy is coupled out of the substrate. The ray then intersects the same partially reflecting surface at point 34 at an incident angle of 75° without noticeable reflection, and then intersects again, at point 36, at an incident angle of 25°, where another portion of the energy of the ray is coupled out of the substrate. In contrast, the ray 38 shown in FIG. 3B, experiences only one reflection at point 40 from the same surface. Further multiple reflections occur at other partially reflecting surfaces.

Figure 4:
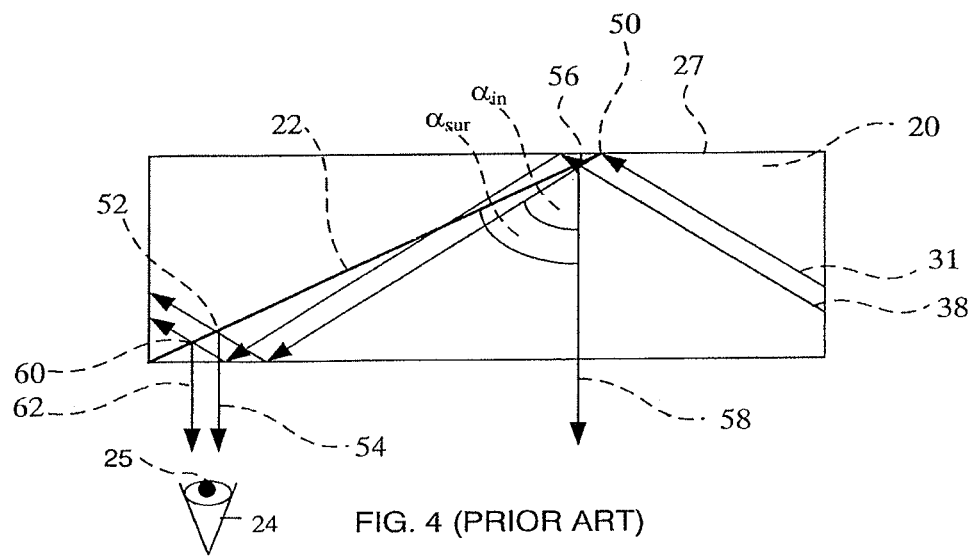

FIG. 4 illustrates this non-uniformity phenomenon with a detailed sectional view of the partially reflective surface 22, which couples light trapped inside the substrate out and into the eye 24 of a viewer. As can be seen, the ray 31 is reflected off the upper surface 27, next to the line 50, which is the intersection of the reflecting surface 22 with the upper surface 27. Since this ray does not impinge on the reflecting surface 22, its brightness remains the same and its first incidence at surface 22 is at the point 52, after double reflection from both external surfaces. At this point, the light wave is partially reflected and the ray 54 is coupled out of the substrate. For other rays, such as ray 38, which is located just below ray 31, the first incidence at surface 22 is before it meets the upper surface 27, at point 56, wherein the light wave is partially reflected and the ray 58 is coupled out of the substrate. Hence, when it impinges on surface 22, at point 60, following double reflection from the external surfaces 26, 27, the brightness of the coupled-out ray is lower than the adjacent ray 54. As a result, all the rays with the same coupled-in angle as 31 that arrive at surface 22 left of the point 52 have lower brightness. Consequently, the reflectance from surface 22 is actually "darker" left of the point 52 for this particular couple-in angle.

It is difficult to fully compensate for such differences in multiple-intersection effects nevertheless, in practice, the human eye tolerates significant variations in brightness, which remain unnoticed. For near-to-eye displays, the eye integrates the light which emerges from a single viewing angle and focuses it onto one point on the retina, and since the response curve of the eye is logarithmic, small variations, if any, in the brightness of the display will not be noticeable. Therefore, even for moderate levels of illumination uniformity within the display, the human eye experiences a high-quality image. The required moderate uniformity can readily be achieved with the element illustrated in FIG. 1. For systems having large FOVs and where a large eye-motion-box (EMB) is required, however, a comparatively large number of partially reflecting surfaces is required to achieve the desired output aperture. As a result, the non-uniformity due to the multiple intersections with the large number of partially reflecting surfaces becomes more dominant, especially for displays located at a distance from the eye. This problem becomes even more crucial for a double-substrate configuration as illustrated in FIG. 2. Since the light waves which are coupled out from the first substrate 20a, have to pass through the entire longitudinal dimension of the second substrate 20b, before being coupled-out into the viewer's eye, the practical outcome is that the output aperture of the first substrate 20a is located remotely from the viewer's eye, and the non-uniformity cannot be tolerated. For these cases, a different method to expand the input light waves along the lateral dimension is required.

To find a proper configuration for the lateral expansion of the input light waves it is important for there to be three main characteristics of the principal substrate, which expands the beam along the longitudinal ξ axis and couples the light waves into the viewer's eye, and should not necessarily be fulfilled for the lateral expansion along the η axis:

a. the lateral expander 20a should not be partially transparent, as the main substrate 20b has to be for see-through applications;

b. the thickness of the lateral expander is not as crucial as that of the principal substrate, and c. the light waves which are trapped inside the substrate should not be coupled out substantially normal to the substrate plane.

On the other hand, as explained above, the non-uniformity issue is important and the cross-talk between the coupling-out surfaces, as illustrated in FIG. 4, should be avoided.

Figure 5:
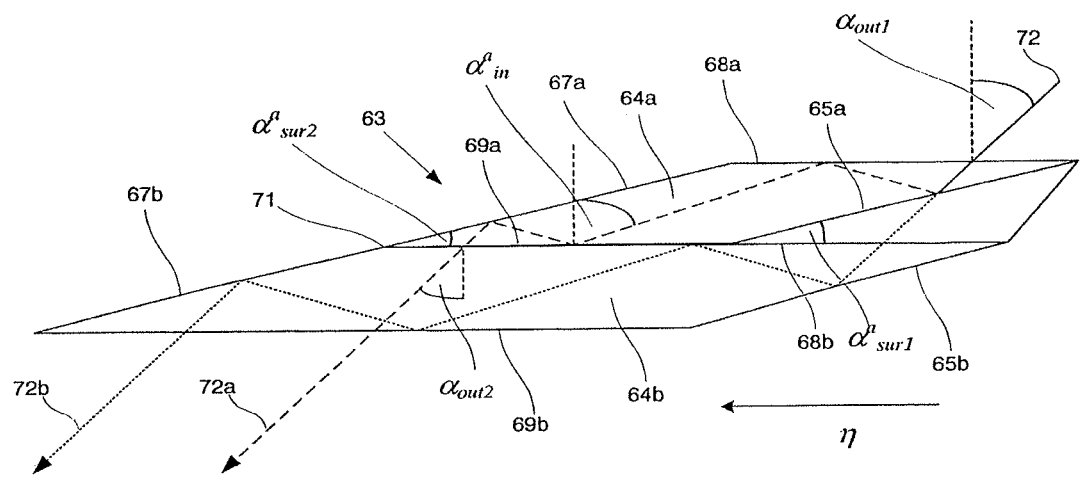

FIG. 5 illustrates an alternative embodiment for laterally expanding the input light waves along the η axis while avoiding the non-uniformity problem according to the present invention. As shown, an optical ray 72 having an input direction of $\alpha_{out1}$ impinges on an optical element 63 composed of two substrates 64a and 64b, wherein each of the substrates 64j (j=a,b) comprises a coupling-in element 65j, a coupling-out element 67j, and an upper major surface 68j and a lower major surface 69j parallel to each other. The lower surface 69a of substrate 64a is attached to the upper surface 68b of substrate 64b defining an interface surface 71. The coupling-in element 65a of the upper substrate 64a is a partially reflecting surface, namely, ray 72 is split into two rays, 72a, and 72b, (usually having the same brightness), which are reflected from surfaces 65a and 65b (the later after passing through surface 65a) and coupled inside substrates 64a and 64b, respectively, by total internal reflection. Unlike surface 65a, surface 65b can be a simple reflecting surface. As shown, rays 72a and 72b are propagating inside the substrates wherein the off axis angles $\alpha_{in}^j$ between the trapped rays and the normal to major surfaces 68j, 69j are respectively $$\alpha_{in}^j = \alpha_{out1} + 2\alpha_{sur1}^j, \quad (6)$$

wherein, each of the surfaces 65j is inclined at an angle $\alpha_{sur1}^j$ to the major surfaces of the substrates (for clarity, only the angles relating to substrate 64a are plotted). After several reflections off the surfaces of the substrate, the trapped light waves reach the second flat reflecting surfaces 67j, which couple the light out of the substrates at off-axis angles $$\alpha_{out2}^j = \alpha_{in}^j - 2\alpha_{sur2}^j = \alpha_{out1} = \alpha_{sur2}^j - 2\alpha_{sur2}^j, \quad (7)$$

wherein each of the surfaces 67j is inclined at an angle $\alpha_{sur2}^j$ to the major surfaces of the substrates, fulfilling the condition of:

$$\alpha_{sur1}^j - \alpha_{sur2}^j = 0, \quad (8)$$

that is to say, surfaces 65j and 67j are parallel to each other, and yield:

$$\alpha_{out1}^j = \alpha_{out1}, \quad (9)$$

namely, the light waves are coupled out from the two substrates in the same direction that the input light wave impinges on the optical element 63. Neither the condition of Eq. (8), or the outcome of Eq. (9) are essential, and the light waves can be coupled out at a different direction than the input direction. One condition, however, that must be fulfilled is that:

$$\alpha_{out2}^a = \alpha_{out2}^b, \quad (10)$$

meaning that for each light wave the coupling-out direction from the two substrates should be identical, otherwise, the coupled-out image will be distorted and image quality will be severely deteriorated. Inserting Eq. (10) into Eq. (7) yields the following condition:

$$\alpha_{sur1}^a - \alpha_{sur2}^a = \alpha_{sur1}^b - \alpha_{sur2}^b, \quad (11)$$

namely, the angular deviation between the coupling-in surface and the coupling-out surface should be identical for both substrates. The simplest way to fabricate the substrates that fulfill the requirement of Eq. (11) is to set the angular deviation to zero, that is, to fabricate a substrate where the input and the output surfaces are parallel to each other. In addition to the inclination angles of the input and the output surfaces, the two substrates may possess other different parameters, such as the thickness and the refractive index of the optical material from which the substrate is fabricated.

Since the interface surface 71 is active in trapping the light waves inside the substrates, an isolation layer must be preserved in the interface surface to ensure the trapping of the image rays inside the substrate by total internal reflection. A possible way to achieve this is to use an air gap between the substrates. In order to achieve a rigid system, it is preferable, however, to apply an optical adhesive in the interface plane, in order to cement the substrates together. Since ray 72a passes through the interface surface 71 before being coupled out from the element 63, an appropriate AR coating can be applied to the interface surface, in order to minimize the Fresnel reflections from this plane. This approach is illustrated herein with an optical system having the following parameters:

$$\alpha_{sur1} = \alpha_{sur2} = 14°; \ F_{out} = \{20°, 45°\}; \ F_{in} = \{48°, 73°\}$$
$$F_{sur1} = F_{sur2} = \{34°, 59°\} \quad (12)$$

where, $F_{in}$ and $F_{out}$ are the angular spectrums of the light waves inside and outside the substrates, respectively, and $F_{sur1}$ and $F_{sur2}$ are the angular spectrums of the incident angles of the light waves impinging on the input and the output surfaces, respectively. The light waves are s-polarized. The optical material of the substrates 64j is Schott N-SF57, having a refractive index of $v_d$=1.8467, and the optical adhesive is NOA 1315, having a refractive index of $v_d$=1.315. The critical angle is therefore $\alpha_{cr}$=45.4°. All of the optical rays which are trapped inside the substrates have an off-axis angle higher than the critical angle, and they are therefore totally reflected from the interface plane 71. The FOV of the image is 25° inside the glass material. For the viewer's eye, the FOV in the air is 47.1°.

As illustrated in FIG. 5, the output aperture of the optical element 63, which is determined by the projection of the coupling out surfaces 67a and 67b on the substrate's major plane 69b, is substantially larger that the input aperture, which is determined by the projection of the coupling-in surface 65a on the major surface 68a. The main differences between the embodiment of the present invention illustrated in FIG. 5 and that of the prior art, are that in this case, the expanding element is thicker than that of the prior art illustrate in FIG. 2, since the coupling-out elements, 67a and 67b, are reflecting surfaces, the output aperture is opaque to the external light, and the coupling-out angle $a_{out2}^j$ of the central light wave is substantially inclined to the normal to the substrate plane. These specific parameters, although important for the main substrate, have no particular importance for the lateral expander. On the other hand, there is no cross-talk between the couplings-out surfaces, as illustrated above in relation to the prior art in FIGS. 3-4.

Figure 6:
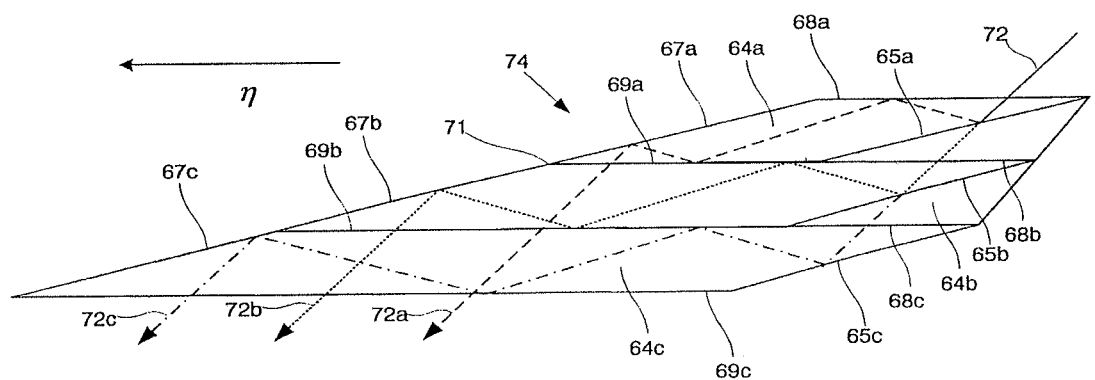

The embodiment described herein is not limited to a system having only two substrates. FIG. 6 illustrates an optical element 74 which is composed of three transparent substrates. A third substrate 64c is added to element 63, wherein the upper major substrate 68c of the third substrate 64c is attached to the lower surface 69b of the second substrate 64b. Another modification is that reflection/transmission ratio of the partially reflecting surface 65a has been changed to around one third (reflection) on two thirds (transmission), while the coupling-in element 65b is no longer a simple reflecting surface but rather a partially reflecting surface, such as surface 65a in element 63, which substantially evenly splits the incoming light waves passing through surface 65a, to be coupled inside substrates 64b and 64c. The coupling-in element 65c of the third substrate 64c, can be a simple reflecting surface. As a result, the output aperture of the lateral expander 74 has been expanded even more, on account of the brightness of the coupled-out light waves. Naturally, more substrates can be added to the lateral expander, in order to expand the output aperture even further. For the sake of simplicity, however, a system which is composed of two main substrates will be considered henceforth.

In the embodiment illustrated in FIG. 5, it was assumed that the partially reflecting surface 65a evenly splits each input ray into two rays having substantially the same brightness, and couples same inside substrates 64a and 64b, by total internal reflection. As a result, the partially reflecting surface 65a should not be sensitive to the incidence angle of the input light wave, and furthermore, the output brightness is reduced by about 50%. The light waves which are coupled out from the substrate are not required to illuminate the entire active area of the coupling-out elements 67a and 67b, namely, the light waves having off-axis angles in the upper part of the angular spectrum of the image are mostly coupled out into the EMB by the reflective surface 67a, while the light waves having off-axis angles in the lower part of the angular spectrum of the image, are mostly coupled out into the EMB by the reflective surface 67b.

As illustrated in the unfolded configuration of FIG. 7, the two marginal and the central light waves of the image are coupled out from the substrate into the viewer's eye 24. As shown, the light waves 75R, 75M, and 75L, having the off-axis angles of $a_{out2}^{max}$, $a_{out2}^{mid}$ and $a_{out2}^{min}$, respectively, illuminate only parts 67a, 67M and 67b of the coupling-out reflecting surfaces, respectively, to coincide on the EMB 76. As a result, it will be advantageous to obtain an angular selective reflective coating on the partially reflecting surface 65a that will have a reflectance higher and lower than 50% for the upper and the lower regions of the angular spectrum, respectively. In such a case, since the brightness of the light waves in the upper and the lower regions depends on the reflectance and the transmittance of the partially reflecting surface 65a, respectively, it will be higher than 50% for these regions. On the other hand, for the light waves in the central region of the angular spectrum, which are evenly coupled out into the EMB by the reflecting surfaces 67a and 67b, the reflectance, and accordingly, the brightness, will be around 50%, which is lower than the brightness at the edges of the image's FOV. For most of the back and front illuminated displays such as LCD and LCOS, however, the illumination, and hence the brightness of the display sources, are usually stronger at the center of the display as a result of the Gaussian distribution of the illuminating light source. Consequently, the non-uniform reflectance curve of the partially reflecting surface can compensate for the non-uniform illumination, and in addition, the brightness of the coupled-out image can be improved.

FIGS. 8A, 8B and 8C illustrate the optical element 78, which is a modified version of the embodiment of the optical element 63, wherein the partially reflecting surface 65a is sensitive to the incident angle of the input light waves, and as a result, the efficiency of the optical system is improved, mostly at the edges of the FOV. FIG. 8A illustrates two rays, 79a and 79b, from the same plane input wave having an incident angle at the major plane of the substrate of $a_{out1}^{max}$ which impinges on the partially reflective surface 65a. As a result of high reflectivity of surface 65a at the higher part of the angular spectrum of the impinging FOV, the rays are mostly reflected from surface 65a and are coupled into the upper substrate 64a. Consequently, they are mostly coupled-out from the substrate by the upper reflective surface 67a.

FIG. 8B illustrates two rays, 80a and 80b, from a second plane input wave having an incident angle at the major plane of the substrate of $a_{out1}^{mid}$, which impinge on the partially reflective surface 65a. Now, the light rays located at the central part of the angular spectrum of the impinging FOV, are evenly split by surface 65a. This means that about half of the intensity of the rays are reflected by surface 65a, and are coupled, such as rays 80aa and 80ba, into the upper substrate 64a, while the other half of the intensity passes through surfaces 65a, and is coupled by the reflective surface 65b, as rays 80ba and 80bb, into the lower substrate 64b. Consequently, the split rays are coupled-out from the substrate by the reflective surfaces 67a and 67b, and therefore, they evenly cover the entire output aperture of element 78.

FIG. 8C illustrates two rays, 81a and 81b, from a third plane input wave having incident angles at the major plane of the substrate of $a_{out1}^{min}$ which impinge on the partially reflective surface 65a. As a result of high transmissivity of surface 65a at the lower part of the angular spectrum of the impinging FOV, the rays are mostly pass through surface 65a and after being reflected from surface 65b, are coupled into the lower substrate 64b. Consequently, they are mostly coupled-out from the substrate by the lower reflective surface 67b.

FIG. 9 depicts a graph showing the brightness of the light waves emerging from a typical front-illuminated LCOS display as a function of the viewing angle, wherein the non uniformity of the emerging light waves is a result of the Gaussian shape of the illuminating light waves. The parameters of the optical system are the same as those given in Eq. 12 above. The brightness is normalized to that of the central light wave and falls to around 67% at the edges of the FOV. To compensate for this non-uniformity, an appropriate coating is provided for the partially reflecting surface 65a.

FIG. 10 is a graph showing the reflection from the partially reflecting surface 65a coated with the coating as a function of the incident angle, for three different wavelengths: 450 nm, 550 nm and 650 nm, which practically cover the relevant photopic region. As shown, the reflection monotonically increases for the relevant angular spectrum of {34°, 59° } from ~30% to ~75%, where it is substantially 50% for the central region of the FOV.

FIG. 11 illustrates the practical efficiency of the partially reflecting surface 65a as a function of the viewing angle of the FOV where the efficiency is defined as $$E(\alpha_{s1}) = T(\alpha_{s1}) \cdot C_1(\alpha_{s1}) + R(\alpha_{s1}) \cdot C_2(\alpha_{s1}), \qquad (13)$$

where, T and R are the transmittance and the reflectance of surface 65a, respectively, $C_1$ and $C_2$ are the percentages of the light wave reflected from surfaces 67a and 67b to the EMB, respectively (clearly, $C_1 + C_2 = 1$), and $\alpha_{s1}$ is the incident angle of the input light wave on surface 65a.

FIG. 12 illustrates the normalized brightness of the coupled-out light waves as a function of the viewing angle which is determined by multiplying the original brightness of the emerging light waves from the display with the practical efficiency of the angular selective reflecting surface 65a. As shown, the two factors compensate each other and the brightness is now substantially uniform over the entire range of the FOV. This improved uniformity is achieved without reducing the brightness of the central part of the FOV.

FIGS. 8A, 8B and 8C illustrate an embodiment wherein the partially reflective surface is sensitive to the impinging angle of the incoming light wave and the output brightness has been improved mainly at the edges of the FOV. It is possible, however, to further exploit the fact that the light waves, which are coupled out from the substrate, do not have to illuminate the entire active area of the coupling-out surfaces, in order to achieve a modified version of embodiment 78, where the coupling-in element is much more sensitive to the incident angle of the input light waves and, as a result, the efficiency of the optical system is significantly improved and the brightness of the coupled-out image is substantially retained, in a similar manner to that of the input image. This goal can be obtained if a method can be found where the coupled-in light waves are split in such a way that all of them illuminate only a part of the coupling-out element which is substantially equal to the input aperture so that the original brightness will be preserved. To achieve this, the angular range of the light waves impinging on the input surface 65a $F_{sur1} \equiv \{\alpha_{min}, \alpha_{max}\}$ is divided into three substantially equal segments: $F_{low} \equiv \{\alpha_{min}, \alpha_{m1}\}$, $F_{mid} \equiv \{\alpha_{m1}, \alpha_{m2}\}$ and $F_{max} \equiv \{\alpha_{m2}, \alpha_{max}\}$. The aim of the design is that the light waves having the higher incident angles in the FOV of $F_{max} \equiv \{\alpha_{m2}, \alpha_{max}\}$ will be coupled out from the upper substrate 64a by the coupling-out element 67a; the light waves having the lower incident angles in the FOV of $F_{min} \equiv \{\alpha_{min}, \alpha_{m1}\}$, will be coupled out from the lower substrate 64b by the coupling-out element 67b and the light waves in the FOV of $F_{mid} \equiv \{\alpha_{m1}, \alpha_{m1}\}$, will be coupled out from the upper substrate 64a by the lower part of the coupling-out element 67a and from the lower substrate 64b by the upper part of the coupling-out element 67b.

In order to achieve this goal, surface 65a of FIG. 5 should substantially reflect all the light waves in the angular range $F_{max}$, such that they will be coupled into the upper substrate 64a, and substantially transmit all the light waves in the angular range $F_{min}$, such that they will be coupled by the reflecting surface 65a into the lower substrate 64b. In addition, a part of the light waves in the angular range $F_{mid}$ should be reflected by surface 65a in such a way that they will be trapped inside the upper substrate 64a but will be coupled out only by the lower part of the coupling-out element 67a, and the other part of the light waves in $F_{mid}$ should pass through surface 65a in such a way that they will be trapped inside the lower substrate 64b but will be coupled out only by the upper part of the coupling-out element 67b.

Consequently, the partially reflecting surface 65a should fulfill, for the entire photopic range of the display source, the following three characteristics:

a. substantially total reflective for the angular range of $\{\alpha_{m2}, \alpha_{max}\}$;
b. substantially transparent for the angular range of $\{\alpha_{min}, \alpha_{m1}\}$; and
c. substantially total reflective for the angular range of $\{\alpha_{m1}, \alpha_{m2}\}$ at the lower part of surface 65a and substantially transparent for the angular range of $\{\alpha_{m1}, \alpha_{m2}\}$ at the upper part of surface 65a.

It is possible to achieve these requirements by applying angular sensitive dielectric coatings on surface 65a, but the process for realizing this coating may be fairly complicated. A simpler way would be to cement surface 65a to the inert part 82 of element 78 using optical adhesives having proper refractive indices that yield critical angles of $\alpha_{m1}$ and $\alpha_{m2}$ at the lower and the upper parts of surface 65a. The high transparency for angles lower than the respective critical angles may be achieved using proper AR coatings.

The method for realizing the required angular selective surfaces is illustrated in FIGS. 13A, 13B and 3C. As shown, the optical element 83 is constructed of two different pairs of substrates, {64aa, 64ab} and {64ba, 64bb}, which are optically cemented together to define three interface planes, 71a, 71b and 71c, respectively (the subscript that denotes the substrate will continue to denote the various parameters or components of this substrate). In addition, surfaces 65aa and 65ab are cemented to the inert parts 82aa and 82bb of element 83 using optical adhesives having proper refractive indices that yield critical angles of $\alpha_{m1}$ and $\alpha_{m2}$ at surfaces 65ab and 65aa, respectively.

FIG. 13A illustrates two rays 84a and 84b from the same plane input wave having incident angles of $\alpha_{si} < \alpha_{m1}$ impinging on surfaces 65aa and 65ab, respectively. These rays pass through the surfaces and are coupled into the substrates 64ba and 64bb by the reflective surfaces 65ba and 65bb, respectively. The input light waves substantially illuminate the entire areas of surfaces 67ba and 67bb, which couple them out of the substrates.

FIG. 13B illustrates two rays, 85a and 85b, from a second plane input wave having the same incident angles of $\alpha_{si} < \alpha_{m2}$ impinging on surfaces 65aa and 65ab, respectively. The rays are reflected from the surfaces and coupled into the substrates 64aa and 64ab, respectively. The input light waves substantially illuminate the entire areas of surfaces 67aa and 67ab, which couple them out of the substrates.

FIG. 13C illustrates two rays, 86a and 86b, from a third plane input wave having the same incident angles of $\alpha_{m1} < \alpha_{si} < \alpha_{m2}$, which impinge on the surfaces 65aa and 65ab, respectively. Ray 86b is reflected from surface 65ab, coupled into substrate 64ab, and coupled out by the reflective surface 67ab. In addition, ray 86a passes through surface 65aa, is coupled into substrate 64ba by the reflective surface 65ba, and consequently, is coupled-out from the substrate by the reflective surface 67ba, as required.

Since each one of the four substrates 64i (i=aa,ab,ba,bb) functions independently, there are no constraints on the co-linearity of each adjacent coupling-in and coupling-out surfaces in each pair. The only constraint is that for each separate substrate 64i, the major surfaces and the coupling-in and the coupling-out surfaces should be parallel to each other, respectively. Moreover, each separate substrate can have a different thickness, a different inclination angle and even be composed of a different optical material, according to the requirements of the optical system.

The realization of the angular sensitive reflecting surfaces 65aa and 65ab utilized in the FIGS. 13A, 13B and 13C is illustrated hereby with an optical system having the following parameters for substrates 64aa and 64ab:

$$\alpha_{sur1} = \alpha_{sur2} = 14°; F_{out} = \{31°, 47°\}; F_{in} = \{59°, 75°\}$$
$$F_{sur1} = F_{sur2} = \{37°, 61°\} \quad (14)$$

and the following parameters for substrates 64ba and 64bb:

$$\alpha_{sur1} = \alpha_{sur2} = 18°; F_{out} = \{23°, 39°\}; F_{in} = \{59°, 75°\}$$
$$F_{sur1} = F_{sur2} = \{41°, 57°\} \quad (15)$$

The light waves are s-polarized. The optical material of the substrates 64i is Schott N-SF57 having a refractive index of $n_d = 1.846$, and the optical adhesives which are adjacent to surfaces 65aa and 65ab, are NOA 148 and NOA 1315 having refractive indices of $n_d = 1.48$ and $n_d = 1.315$, respectively. The overall FOV of the coupled-in image is $F_{out} = \{23°, 47°\}$ (which is practically a FOV of 45° in the air), and the angular range of $F_{sur1} \equiv \{37°, 61°\}$ of the upper substrates is divided into three equal segments: $F_{low} \equiv \{37°, 45°\}$, $F_{mid} \equiv \{45°, 53°\}$ and $F_{max} \equiv \{53°, 61°\}$. FIG. 14A illustrates the graph of the reflection from the reflective surface 65ab, coated with an appropriate AR dielectric coating as a function of the incident angle for three different wavelengths: 450 nm, 550 nm and 650 nm As shown, the reflection is 100%, due to total internal reflection, for angular the spectrum above 45.6°, while it is very low for the incident angles of {37°, 44.5° }.

FIG. 14B illustrates the graph of the reflection from the reflective surface 65aa coated with an appropriate AR dielectric coating as a function of the incident angle for three different wavelengths: 450 nm, 550 nm and 650 nm As shown, the reflection is 100%, due to total internal reflection, for angular spectrum above 53°, while it is very low for the incident angles of {37°, 52.5° }.

FIGS. 13 and 14 illustrate the design outlines and an example of an embodiment comprising two pairs of substrates, wherein the output aperture is increased by a factor of two, without reducing the brightness of the projected image. There are systems, however, having a wide FOV and an input aperture which is remotely located from the EMB, which significantly increases the required input aperture of the main substrate. In these cases, increasing the aperture by a factor of two in not enough and a higher increasing factor is required. To achieve this goal, the increasing method illustrated above can be generalized to increasing factors of n>2. It may now be assumed that it is required to increase the aperture of the image by a factor of n. To achieve the appropriate embodiment, n pairs of transparent substrates should be attached together, wherein for each pair the coupling-in, as well as the coupling-out, surfaces should be adjacently located in the same manner as, for example, surfaces 65aa and 65ab, and surfaces 67aa and 67ab, respectively. In addition, all the coupling-out surfaces should be adjacently located in the same manner as surfaces 67i appearing in embodiment 83. The angular range of the light waves impinging on the input surface of the upper pair $F_{sur1} \equiv \{\alpha_{min}, \alpha_{max}\}$ is divided into 2n−1 substantially equal segments by setting 2n−2 equally separated angles namely, $F_1 \equiv \{\alpha_{min}, \alpha_1\}$, $F_2 \equiv \{\alpha_1, \alpha_2\}$ ... $F_j \equiv \{\alpha_{j-1}, \alpha_j\}$ and $F_{2n-1} = \{\alpha_{2n}, \alpha_{max}\}$. Assuming that the substrates are denoted as $S_j$ where j is the running index from bottom (j=1) to top (j=2n), then the coupling-in elements of substrates $S_1$ and $S_2$ from the lower pair are regular reflecting surfaces. All of the other 2n−2 coupling-in elements are angular sensitive partially reflecting surfaces fulfilling for each substrate $S_j$ (j>2) the following conditions for the entire photopic range:

a. substantially total reflective for the angular range of $\alpha_s > \alpha_{j-2}$; and b. substantially transparent for the angular range of $\alpha_s < \alpha_{j-2}$.

This means that the coupling in element of substrate $S_j$ should reflect all the impinging light waves having incident angles higher than the limit angle of $\alpha_{j-2}$ to couple these light waves inside substrate $S_j$ and to substantially transmit all the other light waves toward the input aperture of substrate $S_{j-2}$.

As explained above, the simplest method to achieve these requirements is to cement each respective coupling-in surface to the adjacent inert part of the embodiment using optical adhesives having proper refractive indices that yield critical angles of $\alpha_{j-2}$. As previously indicated, the high transparency for incident angles, lower than the respective critical angles, can be achieved using proper AR coatings.

As a result of the design procedure illustrated above, the embodiment comprising n pairs of transparent substrates will have the following characteristics:

a. aside from the bottom and the top substrates, the light waves which are coupled inside each substrate $S_j$ (j=2 ... 2n−1) are those in the angular range of $\{\alpha_{j-2}, \alpha_1\}$ ($\alpha_{min}$ and $\alpha_{max}$ are denoted here as $\alpha_0$ and $\alpha_{2n-1}$, respectively). The light waves which are coupled inside substrates $S_1$ and $S_{2n}$ are those in the angular ranges of $\{\alpha_0, \alpha_1\}$ and $\{\alpha_{2n-2}, \alpha_{2n-1}\}$, respectively.

b. each light wave (inside the angular range of the light waves which impinges on the input surface of the upper pair $F_{sur1} \equiv \{\alpha_{min}, \alpha_{max}\}$ having an incident angle of $\alpha_{j-1} < \alpha_s < \alpha_j$ (j=1 ... 2n) is coupled inside two adjacent substrates $-S_j$ and $S_{j+1}$ and is consequently coupled out from the embodiment by the respective coupling-out element 67$_j$ and 67$_{j+1}$.

Therefore, each light wave coupled inside the embodiment by total internal reflection is coupled out by 1/n part of the overall coupling-out element. By proper design, however, substantially all the coupled light waves will cover the designated EMS of the system.

The embodiment of the present invention illustrated in FIGS. 5-14 has several prominent advantages as compared with the embodiment of the prior art illustrated in FIGS. 2-4. The main improvements are that the fabrication process of the multi-substrate embodiment is much simpler than that of a multi-facet single substrate of the prior art. In addition, since each trapped light wave intersects with only a single reflecting surface there is no cross talk between the coupling-out surfaces, and the projected image can be much smoother and of a higher quality than that of the sequential multi-facet element of the prior art, wherein most of the trapped light waves intersect many times with the partially reflecting surfaces, prior to being coupled out from the substrate. Furthermore, for the embodiments illustrated in relation to FIGS. 13 and 14, the lateral expansion of the light waves is achieved without reducing the brightness of the coupled image. There is, however, a consideration which should be taken into an account concerning the output apertures of the element illustrated in the present invention.

Regarding the output aperture, as illustrated in FIG. 15A, a ghost image problem might accrue at the edge of the reflecting surface 67$_j$. As shown, a ray 89 having an off-axis angle $\alpha_{out2}$ is traced from the output aperture backward to the input aperture of the substrate $S_j$. The ray 89 impinges on the reflecting surface at point 91a and is reflected not only once, but rather twice, from the reflecting surface 67$_j$. As a result, the ray is trapped inside the substrate $S_j$ having an off-axis angle $\alpha_{in} + 2 \alpha_{sur2}$, instead of the required angle $\alpha_{in}$. As illustrated in FIG. 15A, this angle fulfils the relation $\alpha_{in} + 2 \alpha_{sur2} > 90°$ and as a result the ray 89 is reflected from the second point 91b, not toward the lower major surface 69$_j$, but toward the upper surface 68$_j$. Ray 89 will therefore impinge on surface 69$_j$ at the angle:

$$\alpha_{in}(act) = 180° - 2\cdot\alpha_{sur2} - \alpha_{in} = 180° - 4\cdot\alpha_{sur2} - \alpha_{out2} \qquad (16)$$

As a result, after an odd number of reflections from the major surfaces and assuming that a $\alpha_{sur1} = \alpha_{sur2}$, the ray will be reflected from the input surface 65$_j$ toward the input aperture at the angle:

$$\alpha_{out1}(act) = \alpha_{in}(act) - 2\cdot\alpha_{sur2} = 180° - 6\cdot\alpha_{sur2} - \alpha_{out2}. \qquad (17)$$

This angle in not necessarily the required angle $\alpha_{out1}$. Using, for example, the parameters of the embodiment given above in relation to Eq. (15), and assuming that, for example, $\alpha_{out2} = 33°$, the actual ray that is coupled into the substrate Si, in order to be coupled-out as ray 89 has the direction of $\alpha_{out1}(act) = 39°$. Hence, not only is the "right" ray that be coupled out as ray 89 missing from the image, but instead there is another ray originated from a "wrong" direction, which creates a ghost image.

A possible way to overcome this problem is illustrated in FIG. 15B. As shown, a flat transparent plate 93 is cemented to the lower surface 69$_j$ of the substrate $S_j$ defining an interface plane 96. The ray 89 is now reflected only once from surface 67$_j$ prior to being coupled into the substrate S$_j$. As such, the coupled ray 97 propagated inside the substrate has an off-axis angle $\alpha_{in}$ which is the "right" direction and no ghost image is created in the image. In such a case, it is required to minimize the Fresnel reflections of the coupled ray 97 at points 98 from the interface plane 96, and it will therefore be preferable to use an optical cement having a refractive index similar to that of the substrate S$_j$.

An alternative way of overcoming the ghost image problem is illustrated in FIG. 15C. In this figure, the adjacent reflecting surface 67$_{j-1}$ is shifted rightward such that its right edge is no longer in contact with the left edge of the reflecting surface 67$_j$, namely the rays that are reflected at the far edge 99 of the reflecting surface 67$_j$ are no longer reflecting toward the EMS. As a result, part of surface 67$_j$ is practically blocked from being active and the segment 99 becomes non-active. Therefore, the ray 89 having the "wrong" direction, fails to illuminate the viewer's eye and the ghost image is avoided. The exact parameters of the solution to the ghost image problem (if any), namely, which method or combination thereof to use, the thickness of plate 93 or the shift of surface 67$_{j-1}$, can be determined according to the various parameters of the optical system, such as the required measure of the output aperture, the FOV of the system and the desired overall thickness of the substrate.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical device, comprising: an input aperture; an output aperture;
at least first and second light-transmitting substrates each having two major surfaces parallel to each other and at least one slanted edge, an input surface for coupling light waves into the light-transmitting substrate for effecting total internal reflection inside the light-transmitting substrate, and an output surface for coupling light waves out of the light-transmitting substrate;
a major surface of the first light-transmitting substrate being attached to a major surface of the second light-transmitting substrate, the input surface of the first light-transmitting substrate being a partially reflecting surface carried on a slanted edge of the first light-transmitting substrate,
part of the light waves passing through the input aperture being partially reflected by the partially reflecting input surface and coupled into the first light-transmitting substrate, another part passing through the partially reflecting input surface and coupled by the input surface of the second light-transmitting substrate into the second light-transmitting substrate,
wherein the input surface of the first light-transmitting substrate is an angular selective reflecting surface sensitive to an incident angle of the input light waves.

2. The optical device according to claim 1, wherein light waves trapped inside the light-transmitting substrates are plane light waves.

3. The optical device according to claim 1, further comprising a third light-transmitting substrate having at least two parallel major surfaces and edges, an input surface for coupling light waves into the third light-transmitting substrate by total internal reflection, and an output surface for coupling light waves out the light-transmitting substrate, wherein a major surface of the third light-transmitting substrate is attached to a major surface of the second light-transmitting substrate.

4. The optical device according to claim 3, wherein the input surface of the second light-transmitting substrate is a second partially reflecting surface,
part of the light waves passing through the input surface of the first light-transmitting substrate is partially reflected by the second partially reflecting input surface and coupled into the first light-transmitting substrate, and
another part passes through the second partially reflecting input surface and is coupled by the input surface of the third light-transmitting substrate into the third light-transmitting substrate.

5. The optical device according to claim 1, wherein the two light-transmitting substrates are optically cemented to each other by an optical adhesive and the refractive index of the optical adhesive is lower than the refractive index of at least one of the light-transmitting substrates.

6. The optical device according to claim 1, wherein the two light-transmitting substrates are different from each other.

7. The optical device according to claim 1, wherein the angular spectrum of the incident angles of the light waves impinging on the input surface of the first light-transmitting substrate has upper and lower parts;
the light waves having incident angles in the upper part of the angular spectrum are mostly coupled out from the light-transmitting substrates by the output surface of the first light-transmitting substrate, and
the light waves having incident angles in the lower part of the angular spectrum, are mostly coupled out from the light-transmitting substrates by the output surface of the second light-transmitting substrate.

8. The optical device according to claim 7, wherein the input surface of the first light-transmitting substrate has a reflectance higher and lower than 50% for the upper and the lower regions of the angular spectrum, respectively.

9. The optical device according to claim 1, wherein at least part of the light waves impinging on the input surface is totally reflected from the input surface of the first light-transmitting substrate and at least part of the light waves impinging on the input surface substantially pass through the input surface of the first light-transmitting substrate.

10. The optical device according to claim 1, further comprising a transparent prism cemented to at least one of the input surfaces defining an interface plane using an optical adhesive, wherein an angular selective coating is applied to the interface plane.

11. The optical device according to claim 10, wherein the refractive index of the optical adhesive is lower than the refractive index of the light-transmitting substrate.

12. The optical device according to claim 1, further comprising a display source, wherein light waves emerging from the display source are coupled into the light-transmitting substrates, the brightness distribution of the light waves emerging from the display source is non-uniform, and the reflectance of the angular selective reflecting surface compensates for the non-uniformity of the display source.

13. An optical device according to claim 1, wherein the input aperture is defined as the projection of the input aperture of the first light-transmitting substrate on a major surface of the first light-transmitting substrate, the output aperture is defined by the projection of the output surfaces of the light-transmitting substrates on a major surface of the second light-transmitting substrate, and the output aperture is substantially larger than the input aperture.

* * * * *